J. E. FINLEY.
Churn-Dasher.

No. 223,643.    Patented Jan. 20, 1880.

Attest:
J. S. Galloway
Chas. J. Saltmarsh

Inventor:
John E Finley

UNITED STATES PATENT OFFICE.

JOHN E. FINLEY, OF MEMPHIS, TENNESSEE.

CHURN-DASHER.

SPECIFICATION forming part of Letters Patent No. 223,643, dated January 20, 1880.

Application filed July 25, 1879.

*To all whom it may concern:*

Be it known that I, JOHN E. FINLEY, of Memphis, in the county of Shelby and State of Tennessee, have invented a new and useful Improvement in Churn-Dashers, of which the following is a specification.

The invention relates to churn-dashers to be used in the ordinary upright churn-tubs.

The object of my invention is to provide a dasher for use in the ordinary upright churn, constructed in such a manner as to force the cream or milk through the perforations in the upper part of the dasher by means of the conical-shaped rim, which is made much smaller at the top, and by being so arranged will carry the air into every part of the milk or cream.

The invention consists in placing upon the ordinary churn-staff a concave cone perforated, below which is placed a conical rim, by which means the cream is forced through the perforated cone with great force, thereby breaking the globules containing the butter.

Figure 1:
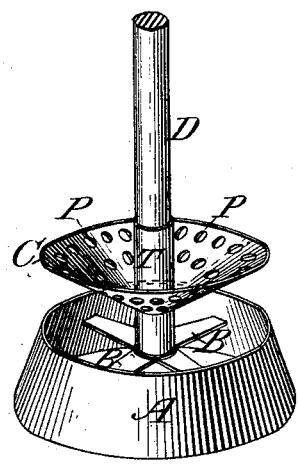
Figure 2:
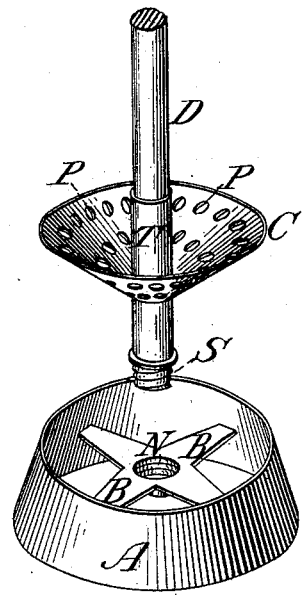

In the accompanying drawings, in which similar letters of reference indicate like parts, Figure 1 is a perspective of a device embodying my invention. Fig. 2 is a view showing the same in detached parts.

To the handle D is attached a thimble, T, on the end of which thimble is the screw S. To the thimble T is firmly secured the perforated cone C, with its perforations P P. To the end of this staff is fastened the conical rim A by means of the nut N in the bars B B.

The dasher is operated by the up-and-down movement of the dasher-staff, which forces the fluid through the conical rim against the perforations in the concave cone.

For the purpose of easily cleansing, the conical rim can be easily taken to pieces, as shown in Fig. 2.

What I claim as my invention, and desire to secure by Letters Patent, is—

The concave cone C, with perforations P P, fastened upon the staff D by means of the thimble T, made detachable by means of the screw S and nut N, the whole to be in combination with the conical rim A and bars B B, as described and set forth.

JOHN E. FINLEY.

Witnesses:
J. S. GALLOWAY,
CHAS. T. SALTMARST.